Nov. 7, 1950   F. P. VOYTERSHARK ET AL   2,528,625
SELF-ALIGNING LAWN MOWER BLADE
Filed Oct. 23, 1945
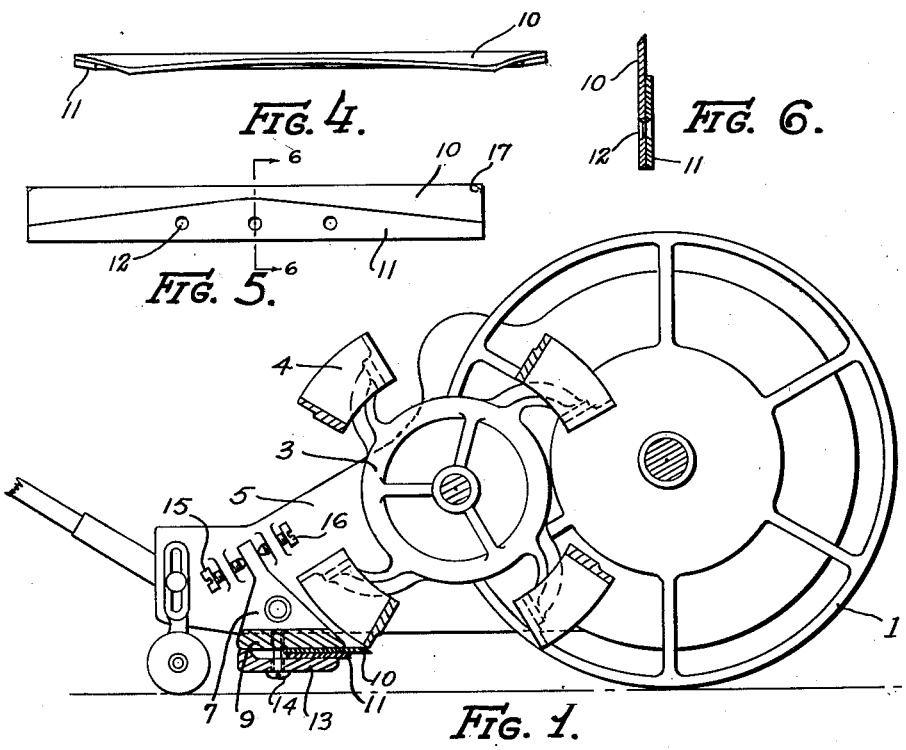
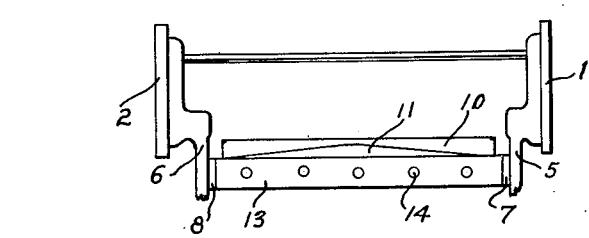
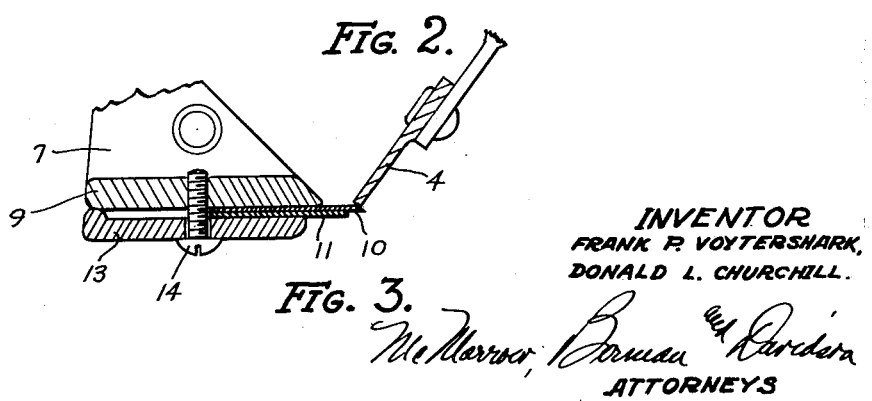
INVENTOR
FRANK P. VOYTERSHARK,
DONALD L. CHURCHILL.
ATTORNEYS Patented Nov. 7, 1950

2,528,625

UNITED STATES PATENT OFFICE 2,528,625

SELF-ALIGNING LAWN-MOWER BLADE

Frank P. Voytershark and Donald L. Churchill, Devon, Milford, Conn.; said Voytershark assignor to said Churchill Application October 23, 1945, Serial No. 624,020

3 Claims. (Cl. 56—289)

1

This invention relates to a self-aligning lawn-mower blade, and more particularly to a self-aligning cutter bar for a lawn-mower.

Present day lawn-mowers are provided with a rotary cutting reel having a number of blades which mate with a fixed cutter bar to cut grass. Adustment is normally provided at each end of the cutter bar to insure a good shearing contact between the knife edge of the fixed bar and the blades on the rotary reel. In normal use of the lawn-mower, the cutter bar wears unevenly and even when an attempt is made to adjust at the ends of the bar, there is still some clearance, usually at the center of the mating surfaces, which decreases the cutting efficiency of the lawn-mower. If further adjustment is attempted to produce a shearing contact at the center of the blades, the friction produced at the ends results in prohibitive operating load.

It is therefore an object of this invention to provide a self-aligning fixed cutter bar which will compensate for excessive wear at the center and at all times insure good shearing contact with the knives of the rotary reel.

Another object of this invention is to provide an improved cutter bar for a lawn-mower having greater flexibility at the ends than in the middle portion so that extreme adjustment is permitted at the ends to insure shearing contact at the middle portion and yet eliminate prohibitive binding at the ends.

It is a further object of this invention to provide an improved cutter bar for lawn-mowers provided with a backing plate having a greater width at the center than at the ends, permitting greater flexibility at the ends of the cutter bar so that very close shearing adjustment may be accomplished at the ends of the cutter bar between the cutting bar and the rotary blades without binding and at the same time insure shearing action along the full length of the cutter blade.

Other objects and advantages of the present invention will appear in the following specification and claims and from the accompanying drawing illustrating the invention, wherein:

Figure 1 is an elevational view, with parts in section, through a lawn-mower showing the rotary blades and the cutter bar;

Figure 2 is a fragmentary bottom view, on a reduced scale, showing the cutter bar mounting;

Figure 3 is an enlarged view, partly broken away and partly in section, of the cutter bar and one of the rotary blades taken on the same plane as Figure 1, showing the relationship between the cutting reel and cutter bar;

Figure 4 is an elevational view showing how the cutter bar is deflected at its ends to conform to the path of the cutter blades, the amount of deflection being greatly exaggerated;

2

Figure 5 is a bottom view of the cutter bar and backing plate; and

Figure 6 is an enlarged sectional view taken on line 6—6 of Figure 5 showing connection between the cutter bar and backing plate.

Referring to the drawing, numerals 1 and 2 designate conventional lawn-mower wheels supporting in conventional manner a rotary cutting reel 3 having mounted thereon conventional spiral cutting blades or knives 4. The side frames 5 and 6 have pivoted on their inner faces supports 7 and 8 supporting therebetween a bar 9.

To the bottom of bar 9 is fastened a fixed cutter bar 10 which at its bottom is provided with a backing plate 11 fixed thereto by countersunk rivets 12, or by spotwelds. The cutter bar, with its backing plate, is clamped as shown in Figure 3 between the bar 9 and another bar 13 which is bolted to the bottom of bar 9 by means of a series of bolts 14. At both ends of the bar 9, adjusting screws, as 15 and 16, are provided to adjust the spacing between the cutting edge of cutter bar 10 and the cutting edges of the rotary blades 4. It is desirable to have a good shearing contact between the cutter bar and the rotary blades along the full length of their cooperating surfaces. The ends of the cutter bar are rounded as at 17 at the top to allow for smooth entry of the rotary knives on to the cutter bar.

As shown in Figures 2 and 5, the backing plate 11 is tapered and is wider in the center portion than at the ends. This extra width in the center provides a more rigid structure in the center and renders the cutter bar 10 less flexible at the center than at the ends. In other words, the tapered shape of the backing plate allows the cutter bar to deflect more readily at each end and provides greater stiffness at the center as illustrated in an exaggerated form in Figure 4. This feature enables the cutter bar to be self-aligning and to insure a continuous shearing contact along the entire length of the cutter blade even though the bar be worn in the middle portion. This may be explained as follows: in operation, the rotary knives 4 revolve and one of the knives 4 makes contact with one end of the flexible cutting bar, actually deflecting the bar a slight amount. Further movement of the rotary cutting reel causes the knife 4 to continue in sliding contact with the flexible cutting bar, and at the center of the cutting bar, deflection of the bar is less, but nevertheless there is contact. In other words, when the cutter bar is quite worn at the center, the greater flexibility at the ends enables sufficient adjustment at the ends to be made to insure actual contact at the center without producing a prohibitive operating load at the ends. It is the varying cutter bar flexibility which permits the knives to be adjusted regardless of how much the knives or bar may be worn.

This self-aligning cutter bar feature may be incorporated on any present-day lawn-mower with a minimum of effort. By removing the existing cutter bar hold-down bolts and rotating the existing bar so that the cutting edge is toward the rear, the existing cutter bar can be used as bar 13 in Figure 3. The flexible cutting bar 10 can thus be held in position by the clamping action of the old cutter bar and the hold-down bolts.

The self-aligning cutter bar 10 is made from steel, heat treated to a tensile strength of 90,000 to 180,000 pounds per square inch or equivalent. The backing plate 11 is made from steel of tensile strength about 90,000 pounds per square inch or equivalent. The cutter bar is made in lengths 16 to 28 inches to accommodate the various treads of present lawn-mowers.

While a certain specific embodiment of this invention has been shown it will be understood that various modifications may be made within the spirit of the invention. Therefore no limitations on the invention are intended other than are imposed by the scope of the appended claims.

We claim:

1. In a lawn mower having a wheeled frame and a cutting reel rotatably supported on said frame, a pair of transverse clamping bars on said frame rearwardly of said reel, a fixed flexible cutting blade clampingly engaged between said clamping bars for cooperation with said cutting reel, and a reinforcing plate underlying said fixed blade along the length thereof, said reinforcing plate tapering outwardly from the center of said fixed blade for stiffening said fixed blade decreasingly from the center to the opposite ends thereof.

2. In a lawn mower having a wheeled frame and a cutting reel rotatably supported on said frame, a transverse resilient cutting blade carried by said frame adjacent the cutting reel for cooperation therewith, and a tapered reinforcing plate on said cutting blade tapering in width from the center to the ends of said blade for stiffening said blade increasingly from the opposite ends to the center thereof.

3. In a lawn mower having a wheeled frame and a cutting reel rotatably supported on said frame, a transverse resilient cutting blade carried by said frame adjacent the cutting reel for cooperation therewith, a tapered reinforcing plate on said cutting blade tapering in width from the center to the ends of said blade for stiffening said blade increasingly from the opposite ends to the center thereof, and clamping members carried by said frame clampingly engaging said cutting blade and reinforcing plate.

FRANK P. VOYTERSHARK.
DONALD L. CHURCHILL.

REFERENCES CITED

The following references are of record in the file of this patent:

UNITED STATES PATENTS

| Number | Name | Date |
|--------|------|------|
| 401,696 | Enos | Apr. 16, 1889 |
| 890,998 | McGuire | June 16, 1908 |
| 905,591 | Rowe | Dec. 1, 1908 |
| 1,724,879 | Kachel | Aug. 13, 1929 |

FOREIGN PATENTS

| Number | Country | Date |
|--------|---------|------|
| 243,062 | Great Britain | Nov. 20, 1925 |